June 13, 1961  R. L. ERWIN  2,988,319
ROTARY PLUG VALVES
Filed June 15, 1960  2 Sheets-Sheet 1

INVENTOR
Robert L. Erwin
BY
ATTORNEY

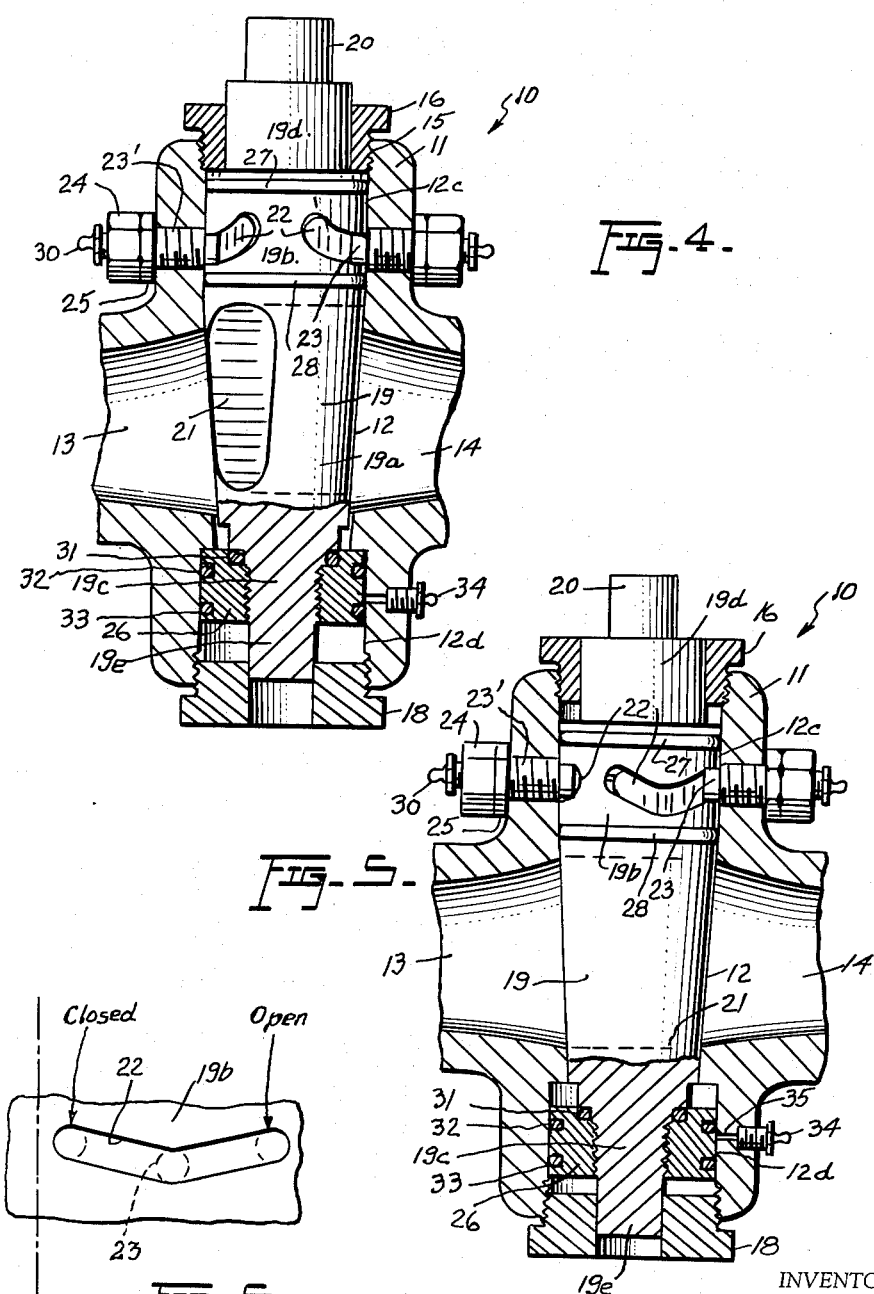

2,988,319
ROTARY PLUG VALVES
Robert L. Erwin, 2004 Glenisle, Durango, Colo.
Filed June 15, 1960, Ser. No. 36,393
8 Claims. (Cl. 251—163)

This invention relates to new and useful improvements in valves, particularly rotary plug valves, and the principal object of the invention is to provide a valve of this type which, especially when used under relatively high fluid pressure conditions, may be easily manipulated between open and closed positions without involving complicated structure for that purpose.

In particular, the invention concerns itself with a rotary plug valve utilizing a tapered plug in a tapered valve chamber, which arrangement in accordance with conventional practice requires the plug to be tightly seated to prevent leakage under high pressure. Such tight seating makes it difficult to rotate the plug between open and closed positions, so that introduction of a lubricant into the valve was conventionally necessary in order to make rotation of the plug more convenient. However, in instances where the valve was used with fluids which became contaminated with the lubricant, other difficulties arose in attempting to separate the lubricant from such fluids while still affording adequate lubrication of the plug. Thus, tapered valve plugs have been proposed in the past, which during opening and closing became unseated from their tapered valve chamber, but here again, complex mechanisms were necessary to effect the unseating and seating of the plug during its rotation.

The present invention eliminates the various disadvantages above outlined by providing a valve with a tapered, rotary plug which is seated and unseated during its opening and closing by very simple yet highly efficient structural means, and which is amply lubricated in a simple manner, without contaminating fluid passing through the valve with the lubricant.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 4 is a fragmentary sectional view, similar to that shown in FIGURE 1 but showing the valve in the half open or half closed position;

FIGURE 5 is a fragmentary sectional view, similar to that shown in FIGURES 1 and 4 but showing the valve in its open position; and FIGURE 6 is a fragmentary diagrammatic view showing the arrangement of one of the cam tracks in the plug.

Figure 1:
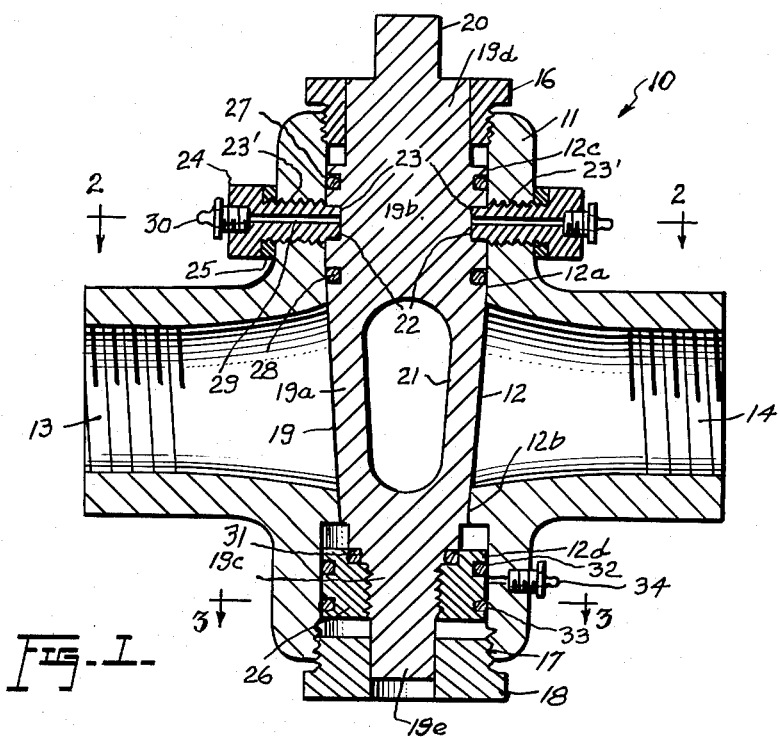
FIGURE 1 is a vertical sectional view of the valve in accordance with the invention, showing the same in a closed position.
Figure 2:
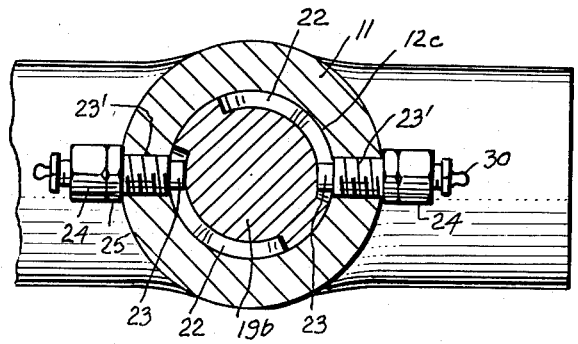
FIGURE 2 is a horizontal sectional view, taken substantially in the plane of the line 2—2 in FIGURE 1.
Figure 3:
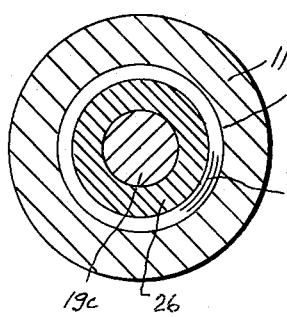
FIGURE 3 is a sectional detail, taken substantially in the plane of the line 3—3 in FIGURE 1.

Referring now to the accompanying drawings in detail, the rotary plug valve in accordance with the invention is designated generally by the reference numeral 10 and embodies in its construction a valve body 11 which is provided with a central, elongated and longitudinally tapered valve chamber 12, having a major end 12a and a minor end 12b. The chamber 12 is in communication with inlet and outlet ports 13, 14, provided in the body 11 in coaxial relation, it being understood that either of these ports may be the inlet and the other the outlet, as desired.

The major end 12a of the chamber 12 has a cylindrical continuation or chamber 12c which is screw-threaded as at 15 to receive a bearing 16, while the minor end 12b of the chamber is provided with a cylindrical continuation which constitutes a chamber portion 12d, screw threaded as at 17 to receive a bearing 18.

An elongated, longitudinally tapered plug 19 is disposed in the valve body 11, the same including an intermediate, tapered portion 19a which is located in the tapered chamber 12, a cylindrical major end portion 19b located in the chamber 12c, a screw threaded minor end portion 19c located in the chamber portion 12d, and a pair of cylindrical end portions 19d, 19e which are slidably and rotatably disposed in the respective bearings 16, 18. A polygonal stem or lug 20 is provided on the plug portion 19d exteriorly of the valve body, whereby rotation may be imparted to the plug in any suitable manner.

The intermediate portion 19a of the plug 19 is formed with a transverse passage 21 for communicating the ports 13, 14 when the valve is in its open position as shown in FIGURE 5, it being understood that when the valve plug is rotated through approximately 90° to the position shown in FIGURE 1, the valve is closed.

In both the closed and open positions of the valve, the tapered plug 19 seats tightly in the tapered chamber 12 to prevent leakage of fluid through the valve. This tight seating would normally make the plug hard to turn between its closed and open positions, but simple means are provided to avoid this difficulty, whereby the plug is unseated by longitudinal or axial shifting in the direction of its major end, so that it becomes easy to turn. These means involve the provision of a pair of cam tracks 22 in the lateral surface of the plug portion 19b, together with a pair of pin elements 23 which are carried by the body 11 and project into the respective cam tracks, as shown.

The pin elements 23 have screw threaded body portions 23' threaded in suitable apertures formed in the body 11 and are also equipped with nut-shaped heads 24, as shown. Jam nuts or lock nuts 25 are provided on the body portions 23' for locking the same against rotation in the valve body 11. As will be noted, particularly from FIGURE 6, the cam tracks 22 are depressed or sloping toward their center from both ends, so that when the valve is either open or closed, the pin elements 23 are disposed in the relatively higher end portions of the cam tracks and the plug 19 is tightly seated in the tapered chamber 12. However, during both opening and closing movement of the plug, the pin elements 23 in engagement with the cam tracks 22 will enter the depressed center portions of the cam tracks when the valve is half open or half closed as shown in FIGURE 4, whereby the plug 19 will be caused to shift axially upwardly in the valve body to an unseated position in the chamber 12 so that the rotational movement of the plug is effortless.

A balancing piston 26 is internally screw threaded and secured on the portion 19c of the plug 19 for sliding movement in the chamber 12d, it being noted that when the plug 19 is unseated as shown in FIGURE 4, sufficient clearance exists between the plug and the chamber 12 for the latter to communicate with the chamber portion 12d so that fluid under pressure in the body of the valve may enter the chamber portion 12d and exert its force against the piston 26, thus biasing the same downwardly and similarly urging the plug 19 to its seated position. At the same time, the force of fluid in the valve body exerts an upward pressure on the plug 19, tending to force the same upwardly in the chamber 12, and since the diameter of the piston 26 corresponds substantially to the major diameter of the plug 19, these opposing forces are equalized, with the result that the plug may be rotated freely without any tendency to seat or unseat itself in its chamber.

It will be noted that the bearings 16, 18 serve not only to center the plug 19 during its opening and closing movement as well as its axial shifting during rotation, but also to eliminate wear by dragging of the plug on the downstream side of the valve. In addition, the bearings also safeguard against the entry of foreign matter into the valve chamber.

A pair of sealing rings 27, 28 are provided in the plug portion 19b above and below the cam tracks 22, and lubrication is provided for the plug portion 19b through the medium of lubricant passages 29 formed in the pin elements 23, body portions 23' and pin heads 24, the latter being equipped with suitable lubricant fittings 30 in communication with the passages 29.

Similarly, sealing rings 31, 32 and 33 are provided on the piston 26, and a lubricant fitting 34, provided in the body 11, communicates through a passage 35 with the chamber 12d for lubricating the piston.

Since the rings 27, 28 are disposed in the chamber 12c and the rings 31, 32, 33 are disposed in the chamber 12d, lubricant admitted through the fittings 30, 34 is confined to those chambers so that it does not leak out of the valve body and so that it does not contaminate the fluid passing through the valve.

In addition, the sealing rings 27, 28, 31, 32, 33 not only eliminate the need for a valve bonnet with a packing gland on the valve stem as is customary in prior art, but also assure that fluid pressure within the valve body is retained to act both upwardly against the plug and downwardly against the piston 26 to provide the balancing action as above explained.

While in the foregoing there has been described and shown the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claims.

What is claimed as new is:

1. In a rotary plug valve, the combination of a valve body having a tapered valve chamber and inlet and outlet ports communicating with said chamber, a tapered plug provided with a transverse passage for communicating said inlet and outlet ports, said plug being positioned in said chamber for partial rotary movement between open and closed positions wherein it is tightly seated in the tapered chamber, means responsive to rotation of said plug for unseating the same in the chamber to facilitate rotation thereof, and means responsive to fluid pressure in said valve chamber for biasing said plug to its seated position against its tendency to become unseated by fluid pressure in said chamber.

2. The device as defined in claim 1 wherein said means comprise a pin element carried by said body, said plug being provided in its lateral surface with a cam track having said pin element extending thereinto, whereby the plug may be axially shifted during its rotation.

3. The device as defined in claim 1 together with bearings provided in said body at the ends of said valve chamber, said plug having end portions rotatably and slidably disposed in said bearings.

4. In a rotary plug valve, the combination of a valve body having a tapered valve chamber and inlet and outlet ports communicating with said chamber, said chamber having major and minor ends and a balancing chamber portion provided at the minor end, said balancing chamber portion being cylindrical and of substantially the same diameter as the major end of the valve chamber, a tapered plug provided with a transverse passage for communicating said inlet and outlet ports, said plug being positioned in said tapered chamber for partial rotary movement between open and closed positions wherein it is tightly seated in the tapered chamber, means responsive to rotation of said plug for unseating the same in the tapered chamber to facilitate rottion thereof, said balancing chamber portion communicating with said tapered chamber when the plug is unseated, and a piston carried by said plug and slidable in said balancing chamber portion during seating and unseating of the plug, said piston being subjected to pressure of fluid in said balancing chamber portion when the plug is unseated, whereby to bias the plug to its seated position against its tendency to become unseated by fluid pressure in said chamber.

5. The device as defined in claim 4 wherein said means comprise a pin element carried by said body, said plug being provided in its lateral surface with a cam track having said pin element extending thereinto, whereby the plug may be axially shifted during its rotation.

6. The device as defined in claim 4 together with bearings provided at the major end of said chamber and in said balancing chamber portion, said plug having cylindrical end portions rotatably and slidably disposed in said bearings.

7. The device as defined in claim 4 together with a lubricating fitting provided on said pin element, said pin element having a lubricant passage communicating said fitting with said cam track in said plug.

8. The device as defined in claim 1 wherein said tapered valve chamber is provided at its minor end with a balancing chamber portion communicating with the tapered valve chamber when said plug is unseated, said means biasing said plug comprising a piston carried by the plug and slidable in said balancing chamber portion during seating and unseating of the plug, said piston being subjected to pressure of fluid in the balancing chamber portion when the plug is unseated.

References Cited in the file of this patent

UNITED STATES PATENTS

| | | |
|---|---|---|
| 2,125,810 | Reed | Aug. 2, 1938 |
| 2,330,493 | Johnson | Sept. 28, 1943 |
| 2,488,932 | Penick | Nov. 22, 1949 |
| 2,702,050 | Thomas | Feb. 15, 1955 |
| 2,711,302 | McWhorter | June 21, 1955 |
| 2,880,748 | Elsey | Apr. 7, 1959 |
| 2,892,610 | Graham | June 30, 1959 |